“United States Patent Office” — 2,951,839 — Patented Sept. 6, 1960

2,951,839
SYNTHETIC PENICILLINS

Frank Peter Doyle, 42 Hillside Gardens, Betchworth, John Herbert Charles Nayler, 31 Clowders Road, Catford, London, and George Newbolt Rolinson, Flat 3, Brockham Park, Betchworth, England No Drawing. Filed May 2, 1960, Ser. No. 23,881

Claims priority, application Great Britain July 15, 1959

9 Claims. (Cl. 260—239.1)

This invention relates to new synthetic compounds of value as antibacterial agents, as nutritional supplements in animal feeds, as agents for the treatment of mastitis in cattle and as therapeutic agents in poultry and animals, including man, in the treatment especially of infectious diseases caused by gram-positive bacteria and, more particularly, relates to novel 6-benzamido-penicillanic acids and nontoxic salts thereof.

This application is a continuation-in-part of our prior, copending application Serial Number 831,483, filed August 4, 1959, and now abandoned, which is a continuation-in-part of our prior copending patent application Serial Number 750,075, filed July 22, 1958, and issued June 21, 1960, as United States Patent No. 2,941,995.

Antibacterial agents such as benzylpenicillin have proved highly effective in the past in the therapy of infections due to gram-positive bacteria but such agents suffer from the serious drawbacks of being unstable in aqueous acid, e.g., upon oral administration, and of being ineffective against numerous so-called resistant strains of bacteria, e.g., penicillin-resistant strains of *Staphylococcus aureus* (*Micrococcus pyogenes* var. *aureus*). In addition, benzylpenicillin is not an effective agent against many bacteria which produce penicillinase. Many of the compounds of the present invention, in addition to their potent antibacterial activity, exhibit resistance to destruction by acid or by penicillinase or are effective against benzylpenicillin-resistant strains of bacteria or inhibit benzylpenicillinase and thus potentiate the action of benzylpenicillin when admixed therewith and are safe for use in patients who cannot be given benzylpenicillin because they exhibit allergic reactions thereto.

There is provided, according to the present invention, a member selected from the group consisting of an acid having the formula

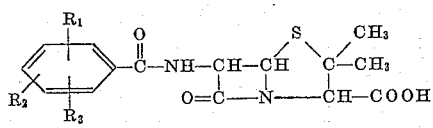

wherein $R_1$, $R_2$ and $R_3$ each represent a member selected from the group consisting of hydrogen, nitro, amino, (lower)alkyl, (lower)alkylamino, di(lower)alkylamino, acylamino (where the acylating agent is an aliphatic carboxylic acid containing from one to ten carbon atoms inclusive and thus may also be named (lower)alkanoylamino, chloro, bromo, iodo, fluoro, trifluoromethyl, allyl, allyloxy, hydroxy, sulfamyl, (lower)alkylthio, cyclohexyl, cyclopentyl, cycloheptyl, aryloxy [including phenoxy, chlorophenoxy, bromophenoxy, (lower)alkylphenoxy, e.g., tolyloxy and (lower)alkoxyphenoxy, e.g., methoxyphenoxy, etc.], aralkyl [including benzyl, α- and β-phenethyl, and α- and β- and γ-phenylpropyl, etc.], arylthio [including phenylthio, chlorophenylthio, (lower)alkylphenylthio, (lower)alkoxyphenylthio, etc.] and aryl [including phenyl, chlorophenyl, bromophenyl, (lower)alkylphenyl, (lower)alkoxyphenyl, etc.], and nontoxic salts thereof, including nontoxic metallic salts such as sodium, potassium, calcium and aluminum, the ammonium salt and substituted ammonium salts, e.g., salts of such nontoxic amines as trialkylamines, including triethylamine, procaine, dibenzylamine, N-benzyl-beta-phenethylamine, 1-ephenamine, N,N'-dibenzylethylenediamine, dehydroabietylamine, N,N'-bis-dehydrobietylethylenediamine, N-(lower)alkylpiperidines, e.g., N-ethylpiperidine, and other amines which have been used to form salts with benzylpenicillin. The term "(lower)alkyl" as used herein means both straight and branched chain aliphatic hydrocarbon radicals having from one to ten carbon atoms such as methyl, ethyl, propyl, isopropyl, butyl, isobutyl, t-butyl, amyl, hexyl, 2-ethylhexyl, heptyl, decyl, etc. Similarly, where the term "(lower)" is used as part of the description of another group, e.g., "(lower)alkoxy," it refers to the alkyl portion of such group which is therefore as described above in connection with "(lower)alkyl." The term "aryl" as used herein (in the terms "aryl," "arylthio" and "aryloxy") refers to the phenyl radical per se and to substituted phenyl radicals of the formula:

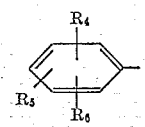

wherein $R_4$, $R_5$ and $R_6$ each represent a member selected from the group consisting of hydrogen, fluoro, chloro, bromo, iodo, trifluoromethyl, (lower)alkyl, (lower)alkoxy, hydroxy, nitro and amino. Also included within the scope of the present invention are easily hydrolyzed esters which are converted to the free acid form by chemical or enzymatic hydrolysis.

The products of the present invention are prepared by reaction of 6-aminopenicillanic acid, preferably in the form of a neutral salt such as the sodium salt or the triethylamine salt, with an acid chloride having the formula:

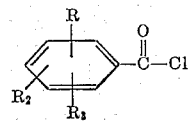

wherein $R_1$, $R_2$ and $R_3$ have the meaning set forth above, or its functional equivalent as an acylating agent for a primary amino group. Such equivalents include the corresponding carboxylic acid bromides, acid anhydrides and mixed anhydrides with other carboxylic acids, including monoesters, and particularly lower aliphatic esters, of carbonic acid.

The substituted benzoic acids and benzoyl chlorides which are used in the preparation of the compounds of the present invention may be prepared by a variety of synthetic methods which are common in the art. Most of these starting compounds are described in the prior art and many of them are commercially available. Detailed discussions of methods for the preparation of these starting materials are found in such reference works as the "Chemistry of Carbon Compounds," E. H. Rodd, Editor (1956), Elsevier Publishing Company, particularly in volumes IIIA and IIIB.

In those cases wherein any of $R_1$, $R_2$ and $R_3$ is amino or alkylamino, i.e., wherein the substituent on the phenyl ring has a reactive hydrogen which might react with an acylating agent for primary amines, such amino or alkylamino group is protected in the conventional manner prior to formation of the acid chloride or its functional equivalent as an acylating agent as set forth above. The several methods used to protect the amino group include the method set forth in a "A Textbook of Biochemistry," page 113, by P. H. Mitchell (1946), McGraw Hill Book Company, Inc., New York, New York. The subsequent removal of the protecting group to form the free amino-substituted or alkylamino-substituted penicillin can be effected by catalytic hydrogenation, e.g., with palladium or platinum on barium carbonate or on carbon. Suitable protecting groups are of the general formula R''—O—CO— wherein R'' is an allyl, benzyl, substituted benzyl, phenyl, substituted phenyl or trityl group. Alternatively, those compounds wherein any of $R_1$, $R_2$ (or) $R_3$ is an amino group may be prepared by forming the corresponding nitro compound which is then hydrogenated by conventional means to form the amino derivative.

Thus, an elegant procedure for preparing a compound of the present invention by way of a mixed anhydride with ethoxy- or isobutoxy-carbonic acid comprises mixing 0.01 mole of an acid (whose acid chloride is set forth above), 0.01 mole isobutyl chloroformate and 0.011 mole tertiary hydrocarbonyl or aliphatic amine such as triethylamine in an anhydrous, inert and preferably water-miscible solvent such as p-dioxane (e.g., 20 ml.) and if desired 2 ml. pure, dry acetone for about thirty minutes in the cold, e.g., at about 4° C. To this solution of the mixed anhydride there is then added a chilled solution of 0.01 mole 6-aminopenicillanic acid and 0.01 mole tertiary hydrocarbonyl amine, e.g., triethylamine, in, for example, 20 ml. of a solvent such as water. The reaction mixture is stirred for a period of an hour or so to form the substituted ammonium salt of the desired product. The mixture may then, if desired, be extracted at alkaline pH (such as pH 8; aqueous sodium bicarbonate may be used, for example, if necessary to adjust the pH) with a water-immiscible solvent such as ether to remove unreacted starting materials. The product in the aqueous phase is then converted to the free acid, preferably in the cold under a layer of ether by the addition of dilute mineral acid, e.g., 5N $H_2SO_4$ to pH 2. The free acid is then extracted into a water-immiscible, neutral organic solvent such as ether and the extract is washed with water quickly in the cold, if desired, and then dried, as with anhydrous $Na_2SO_4$. The product in the ethereal extract in its free acid form is then converted to any desired metal or amine salt by treatment with the appropriate base, e.g., a free amine such as procaine base or a solution of potassium 2-ethylhexanoate in dry n-butanol. These salts are usually insoluble in solvents such as ether and can be recovered in pure form by simple filtration.

Another method of preparing an ethereal solution of the acid form of a compound of the present invention comprises preparing a solution in 20 ml. water of 0.00463 mole 6-aminopenicillanic acid and 1.56 gm. sodium bicarbonate, adding 0.00476 mole of an acid chloride whose formula is set forth above and shaking vigorously at room temperature, e.g., for twenty to sixty minutes. The mixture is then extracted with ether to remove unreacted or hydrolyzed starting materials. The solution is then acidified (preferably in the cold) to pH 2, as with dilute sulfuric acid, and the free acid form of the product is extracted into ether (e.g., two portions of 25 ml.). This ethereal extract is dried, as with anhydrous sodium sulfate, and the drying agent is removed to leave a dry ethereal solution from which the product is easily isolated, preferably in the form of an ether-insoluble salt such as the potassium salt. This procedure is used when the acid chloride reacts with a primary amine more rapidly than it does with water, as determined by simple test. In this procedure the acid chloride may be replaced by an equimolar amount of the corresponding acid bromide or acid anhydride.

Since some of the antibiotic substances obtained by the process of this invention are relatively unstable compounds which readily undergo chemical changes resulting in the loss of an antibiotic activity, it is desirable to choose reaction conditions which are sufficiently moderate to avoid their decomposition. The reaction conditions chosen will, of course, depend largely upon the reactivity of the chemical reagent being used. In most instances, a compromise has to be made between the use of very mild conditions for a lengthy period and the use of more vigorous conditions for a shorter time with the possibility of decomposing some of the antibiotic substance.

The temperature chosen for the process of preparation of the derivatives of penicillanic acid should in general not exceed 30° C. and in many cases a suitable temperature is ambient temperature. Since the use of strongly acid or alkaline conditions in the process of this invention should be avoided, it has been found preferable to perform the process at a pH of from 6 to 9, and this can conveniently be achieved by using a buffer, for example, a solution of sodium bicarbonate, or a sodium phosphate buffer. In addition to the use of aqueous media for the reaction, including filtered fermentation broths or aqueous solutions of crude 6-aminopenicillanic acid, use can be made of organic solvents which do not contain reactive hydrogen atoms. Examples of such inert solvents are dimethylformamide, dimethylacetamide, chloroform, acetone, methyl isobutyl ketone and dioxane. Frequently, it is highly satisfactory to add an aqueous solution of a salt of 6-aminopenicillanic acid to a solution of the acylating agent in an inert solvent and preferably in an inert solvent which is miscible with water, such as acetone or dimethylformamide. Vigorous stirring is, of course, advisable when more than one phase is present, e.g., solid and liquid or two liquid phases.

At the conclusion of the reaction, the products are isolated, if desired, by the techniques used with benzylpenicillin and phenoxymethylpenicillin. Thus, the product can be extracted into diethyl ether or n-butanol at acid pH and then recovered by lyophilization or by conversion to a solvent-insoluble salt, as by neutralization with an n-butanol solution of potassium 2-ethylhexanoate, or the product can be precipitated from aqueous soltuion as a water-insoluble salt of an amine or recovered directly by lyophilization, preferably in the form of a sodium or potassium salt. When formed as the triethylamine salt, the product is converted to the free acid form and thence to other salts in the manner used with benzylpenicillin and other penicillins. Thus, treatment of such a triethylamine compound in water with sodium hydroxide converts it to the sodium salt and the triethylamine may be removed by extraction, as with toluene. Treatment of the sodium salt with strong aqueous acid converts the compound to the acid form, which can be converted to other amine salts, e.g., procaine, by reaction with the amine base. Salts so formed are isolated by lyophilization or, if the product is insoluble, by filtration. A particularly elegant method of isolating the product as a crystalline potasium salt comprises extracting the product from an acidic, aqueous solution (e.g., pH 2) into diethyl ether, drying the ether and adding at least one equivalent of a solution of potassium 2-ethylhexanoate (e.g., 0.373 gm./ml.) in dry n-butanol. The potassium salt forms, precipitates, usually in crystalline form, and is collected by filtration or decantation.

6-aminopenicillanic acid is prepared according to Batchelor et al. (Nature 183, 257, 258, January 24, 1959) or Belgian Patent 569,728.

PREPARATION OF 6-AMINOPENICILLANIC ACID

As set forth in our prior, copending patent application of which this application is a continuation-in-part, the intermediate 6-aminopenicillanic acid is isolated after removal of the natural penicillins from penicillin fermentation broths prepared without the use of added precursors such as phenylacetic acid. For this purpose, suitable penicillin-producing moulds include species of Penicillium, for example *Penicillium chrysogenum* 5120C, and the members of the notatum-chrysogenum group. The mould is grown preferably under aerobic submerged conditions. The culture medium used can be one of the generally accepted media commonly used in the preparation of penicillins. The culture medium usually consists essentially of a carbohydrate nutrient material, for example glucose or lactose; calcium carbonate, sodium sulphate, and a nitrogenous material capable of providing the nitrogen necessary for the growth of the mould. The nitrogenous material can be either a natural substance, for example, peanut meal, or it can be one or more chemical compounds containing nitrogen, for example ammonium salts such as ammonium lactate or ammonium acetate. Where one or more chemical compounds are used as the nitrogenous material it is usual to incorporate in the culture medium very small amounts of a number of metals such as calcium, iron, zinc, copper, magnesium and manganese and these are normally introduced in the form of an aqueous solution of their salts. A suitable culture medium containing ammonium salts as the nitrogenous material is described by Jarvis and Johnson, J.A.C.S., 69, 3010, (1947), and J. Bact. 59, 51, (1950). Natural nitrogenous materials such as peanut meal usually contain sufficient amounts of suitable inorganic salts and thus when such materials are used in the culture medium it is usually not necessary to make a separate addition of inorganic salts.

The fermentation conditions used in the preparation of the fermentation liquor used in this invention can vary between wide limits, but it has been found preferable to use conditions similar to those commonly used in the preparation of Penicillin G. The temperature employed is preferably one from 20° C. to 35° C. and very satisfactory results have been obtained using a temperature of 25–27° C. The time required for the fermentation depends upon the culture medium and the mould used and the temperature at which the fermentation is carried out. Normal fermentation times are from 48 to 120 hours. The progress of the fermentation can be followed by means of periodic assay.

The fermentation liquor is obtained most satisfactorily when the fermentation is carried out under highly aerobic conditions. In the small scale operations referred to in the examples of this specification, aerobic conditions were achieved by shaking the fermentation mixture on a rotary shaking machine. When working on a larger scale, aerobic conditions can conveniently be obtained either by bubbling air or oxygen through the fermentation mixture, or by rapidly stirring the fermentation mixture. If desired, a combination of stirring and the bubbling of air or oxygen can be used.

It is sometimes preferred to prepare the antibiotic substances by the use of the isolated 6-aminopenicillanic acid or one of the intermediate concentrates obtained during its isolation. A concentrated solution of 6-aminopenicillanic acid can be prepared by evaporating the clarified harvest brew at reduced temperature and pressure to a small volume. If desired, the penicillins present in the brew can be largely removed by extraction with an organic solvent such as butyl acetate at an acid pH. After neutralizing the liquid substantial amounts of impurities can then be precipitated by the addition of solvents such as acetone, methanol or ethanol. After separating such impurities the clear liquor may then be further concentrated to give a concentrated preparation.

The production by the process of this invention of antibiotic material from fermentation liquor having little or no antibiotic activity is clearly indicated if, before the addition of one of the chemical reagents hereinbefore specified to the fermentation liquor, the penicillins already present as a result of the fermentation reaction by which the fermentation liquor was obtained are removed. This removal can readily be achieved as indicated above by extracting the penicillins from the acidified fermentation liquor by means of an organic solvent, for example, butyl acetate, in which the penicillins are soluble. It will be seen from the examples below that in some instances a very considerable increase in antibiotic activity was obtained as a result of the chemical modification of the fermentation liquor according to the process of this invention.

Thus, 6-aminopenicillanic acid was prepared and isolated as follows:

(a) A strain of *Penicillium chrysogenum* 5120C (obtained from Professor E. B. Chain, Istituto Superiore di Sanita, Rome) was first grown on a glycerol-molasses agar slope for 7 days at 26° C. Sterile distilled water was then added and the spores washed off the surface of the culture to produce a spore suspension. About 10 mls. of this suspension were used to inoculate 5 litres of seed medium in a 10-litre stainless steel stirred fermenter. The seed medium contained 8% w./v. corn steep liquor, 6% w./v. of dextrin and tap water, the pH being adjusted to 6.1 before sterilizing the fermenter and its contents. The tank was stirred at 500 r.p.m. with an air flow of 1 vol./vol./min. and maintained at 27° C. for 48 hours. A volume of 3.2 litres of the contents of this fermenter was then transferred aseptically into a 90-litre stainless steel fermenter containing 50 litres of fermentation medium consisting of peanut meal 3.0% w./v., lactose 4.0% w./v., $Na_2SO_4$ 0.1% w./v., $CaCO_3$ 1.0% w./v. and tap water. The pH was adjusted to 7.2 before the fermenter and its contents were sterilized. After inoculation the tank was maintained at 26–28° C. for 4 days and stirred at 600 r.p.m. by means of an impeller of 12.5 cms. diameter. Air bubbled through the tank at the rate of 1 vol./vol./min. Foaming was controlled by the periodic addition of lard oil containing 2% of octadecanol.

The brew obtained was clarified and 40 litres thereof was concentrated in vacuo to a volume of 4 litres. The pH was then adjusted to 3.0 and the precipitate which formed was removed by centrifuging and the clear liquor was extracted once with half its volume of butyl acetate. The aqueous phase was separated and the pH adjusted to 7.5. Three volumes of acetone was then added with stirring and the precipitate removed by centrifuging. The clear liquor was then concentrated to 2280 mls. and the pH adjusted to 7.0. It had a potency of 54 u./mgm. assayed as described below.

The 6-aminopenicillanic acid was assayed by reacting a sample with phenylacetyl chloride and assaying the penicillin found by the cup plate method described by N. G. Heatley in Biochem. J., 38, 61 (1944) using *B. subtilis* as the bacterium. The purity of the preparation can then be expressed in units per mgm. (u./mgm.) of dry substance.

The potency of pure 6-aminopenicillanic acid assayed by this method is 2750 u./mgm.

(b) Twelve hundred mls. of the concentrate of potency 54 u./mgm. were percolated through 200 gms. of Dowex I resin conditioned with hydrochloric acid. The column was washed with water and this wash was combined with the percolate. The assay of this solution proved it to contain 15% of the 6-aminopenicillanic acid applied. The column was then eluted with 0.05 N hydrochloric acid. The pooled active fractions of the eluate contained 81% of the original 6-aminopenicillanic acid, the solution assaying at 900 u./mgm. The eluate was then adjusted to pH 6.0 and concentrated to 25 mls. in vacuo, concentrated hydrochloric acid was added with stirring to bring the pH to 4.3 and the crystalline 6-aminopenicillanic acid then filtered off and washed with water followed by acetone, and then dried in vacuo. The yield was 1.0 gm. assaying at 2200 u./mgm. (80%) pure. Repeated precipitation of the crystalline material from neutral aqueous solution by the addition of hydrochloric acid gave a white crystalline solid of melting point 209–210° C. assaying at 2740 u./mgm. analyzing as follows: (Found: C, 44.6;

H, 5.7; N, 13.1; S, 14.1%. $C_3H_{12}O_3N_2S$ requires: C, 44.4; H, 5.6; N, 13.0; S, 14.8%).

PREPARATION OF DERIVATIVES OF 6-AMINO-PENICILLANIC ACID

The procedure to be followed in preparing antibiotic substances from 6-aminopenicillanic acid depends largely upon the extent to which the starting material has itself been purified. Thus, 6-aminopenicillanic acid may be used in three different stages of purification, as indicated below:

(a) *From isolated 6-aminopenicillanic acid.*—When 6-aminopenicillanic acid is available in relatively pure form it is only necessary to use a small excess (ca. 20%) of reagent and the product is, in turn, obtained fairly pure (as indicated by manometric assay using penicillinase).

The reagents used in this way include fifteen different monocarboxylic acid chlorides and also adipyl chloride, propionic anhydride, carbobenzoxyglycine ethoxy-formic anhydride, benzyl chloroformate, and p-toluenesulphonyl chloride.

(b) *From 6-aminopenicillanic acid concentrates.*—The starting material was a clarified fermentation liquor which has been subjected to an initial concentration procedure and from which the natural penicillins had been substantially removed by solvent extraction at pH 2 to 3. The neutralized aqueous solution usually contained 0.6–1.2 mg./ml. of 6-aminopenicillanic acid, which represented about 1% of the total solids present.

With such material it was necessary to use a much larger excess of reagent (10 to 50 times the theoretical amount) because various impurities (e.g., amino-acids and simple peptides) would also be susceptible to acylation and similar reactions. The products were worked up in essentially the same way as in (a), but the resulting sodium salts were, of course, very much less pure.

The reagents used in this way include phenoxy-acetyl chloride, phenylacetyl chloride, α-chlorophenylacetyl chloride, chloroacetyl chloride, diphenylacetyl chloride, and adipyl chloride (all of which had also been reacted by Method (a) and also α-naphthyl acetyl chloride, β-naphthoxyacetyl chloride and p-nitrophenoxyacetyl chloride.

(c) *From dilute brew.*—The initial material was the original clarified fermentation brew from which natural penicillins had been substantially removed by solvent extraction at pH 2 to 3, but which had not been concentrated. It was thus about ten times more dilute than the solutions used in Method (b). Use of a large excess of reagent was again essential. With this very dilute material no attempt was made to isolate the reaction products, but the formation of antibiotic material was demonstrated by the increased antibacterial activity of the solution after reaction and by paper chromatography, a new zone of biologically active material being detected in every case.

The reagents used successfully in this way include phenoxyacetyl chloride, phenylacetyl chloride, α-naphthylacetyl chloride, α-naphthoxyacetyl chloride, β-naphthoxyacetyl chloride, p-nitrophenoxyacetyl chloride, α-chlorophenylacetyl chloride, diphenylacetyl chloride, crotonyl chloride, chloroacetyl chloride, phthalimidoacetyl chloride, benzoyl chloride, hexahydrobenzoyl chloride, m-sulphobenzoyl chloride, adipyl chloride, propionic anhydride, and n-butyric anhydride.

Two typical procedures are illustrated in detail as performed with phenoxyacetyl chloride to produce the known penicillin V, thus:

*Procedure A.*—A strain of *Penicillium chrysogenum* (5120C obtained from Professor E. B. Chain, Istituto Superiore di Sanita, Rome) was grown on a glycerol-molasses agar slope for 7 days at 26° C. The spores obtained were removed by washing with sterile distilled water and the suspension of spores obtained was used to inoculate 100 ml. of a culture medium contained in a 500 ml. conical flask. The flask and its contents had previously been sterilized with steam under pressure in an autoclave. The culture medium used was one having the following composition:

| | Parts by weight |
|---|---|
| Water | 100 |
| Corn steep liquor | 8 |
| "Liquid glucose" | 6 | and the pH of the medium had been adjusted to a value of 5.2–5.3 by the addition of a solution of sodium hydroxide. The "liquid glucose" used was a mixture of carbohydrates consisting essentially of maltose, glucose and low molecular weight dextrins. The inoculated flask was shaken for 48 hours at a constant temperature of 26° C. on a rotary shaking machine having a throw of 3.4 cm. and operating at 250 r.p.m. At the end of this period of 48 hours a substantial growth of mycelium had been obtained in the flask. The resulting culture was then used to inoculate a synthetic fermentation medium without the addition of an added precursor. The fermentation medium used had the following composition:

| | Parts by weight |
|---|---|
| Water | 100.0 |
| Lactose | 4.0 |
| Glucose | 2.0 |
| Ammonium lactate | 0.5 |
| Ammonium acetate | 0.3 |
| $KH_2PO_4$ | 0.3 |
| $Na_2SO_4$ | 0.05 |
| $FeSO_4.7H_2O$ | 0.01 |
| $MgSO_4.7H_2O$ | 0.025 |
| $ZnSO_4.7H_2O$ | 0.002 |
| $MnSO_4$ | 0.002 |
| $CaCl_2.2H_2O$ | 0.005 |
| $CuSO_4.5H_2O$ | 0.0005 |
| $CaCO_3$ | 1.0 |

The pH of the fermentation medium was about 6. The fermentation was carried out in a flask on a shaking machine at 26° C.

At the end of the 96 hours' fermentation period, the mycelium obtained was filtered from the fermentation broth and the fermentation liquor obtained as the filtrate was acidified to pH 3 with phosphoric acid and extracted once with half its volume of butyl acetate at 5° C. which removed most of the penicillins which it contained.

The extracted fermentation liquor was neutralized with sodium hydroxide solution and assayed by means of the cup plate method described by N. G. Heatley in Biochem. J., 38, 61 (1944), using *B. subtilis* as the bacterium.

A 50 ml. portion of the extracted fermentation liquor was brought to pH 8 by the addition of solid sodium bicarbonate and stirred at 0° C. while a solution of 0.5 gm. of phenoxyacetyl chloride in acetone was added in the course of a few minutes. The mixture was stirred at 0° C. for one hour, filtered, and excess reagent was removed by extraction with three portions of ether. The ether extracts were themselves washed with water and the washings added to the main aqueous solution which was then readjusted to pH 6 to 7 by the addition of hydrochloric acid.

Assay of the aqueous solution obtained (which had a volume of 65 ml.) using the method referred to above, showed that it contained a material having considerable antibiotic activity which was about 11 times greater for the whole volume of liquid than that of the initial solution. The results obtained from the assay were as follows:

| | Activity (International Units) |
|---|---|
| Extracted fermentation liquid (volume 50 ml.) | 650 |
| Reaction product (volume 65 ml.) | 7,150 |

By means of paper chromatography it was shown that the antibiotic material contained in the aqueous solution had an Rf value of the same order as penicillin V and the stability of the aqueous solution at pH 2 also indicated a resemblance to that of penicillin V.

*Procedure B.*—This procedure is typical of the reaction of isolated 6-aminopenicillanic acid with monocarboxylic acid chlorides.

A solution of phenoxyacetyl chloride (360 mgm.) in dry acetone (5 ml.) was added dropwise during 10 minutes to a stirred solution of 6-aminopenicillanic acid (450 mgm., approximately 75% pure) in 3% aqueous sodium bicarbonate (18 ml.) and acetone (12 ml.). When addition was complete the mixture was stirred at room temperature for 30 minutes and then extracted with ether (30 ml. in 3 portions), only the aqueous phase being retained. This aqueous solution was covered with butanol (5 ml.) and adjusted to pH 2 by the addition of N hydrochloric acid. After separating the layers, the aqueous phase was extracted with two 2.5 ml. portions of butanol, adjusting to pH 2 each time. The combined butanol solutions (which at this stage contained the free penicillin acid) were washed with water (3×2 ml.) and then shaken with water (10 ml.) to which sufficient 3% sodium bicarbonate solution was added to bring the aqueous phase to pH 7. The butanol solution was further extracted with two 5 ml. portions of water to each of which was added enough bicarbonate solution to produce an aqueous phase of pH 7. The combined aqueous solutions were washed with ether (20 ml.) and then evaporated at low temperature and pressure to leave the crude sodium salt of phenoxymethyl penicillin which, after drying in a vacuum desiccator, was obtained as a slightly hygroscopic powder (591 mgm.).

The purity of the product was estimated by the penicillinase assay as 73% and, by bioassay, as 68%. In its chromatographic behaviour and its antibacterial spectrum the product showed no significant difference from authentic phenoxymethyl penicillin. It also exhibited the relative stability towards acids which is characteristic of this particular penicillin. No loss of activity could be detected after two hours at pH 2.

The following examples will serve to illustrate this invention without limiting it thereto.

*Example 1.—Phenylpenicillin*

The sodium salt of phenylpenicillin was obtained by the process of Procedure B but using benzoyl chloride instead of phenoxyacetyl chloride. The yield of crude sodium salt (purity 69%) was 109 mgm. per 100 mgm. of 6-aminopenicillanic acid. The percentage remaining after 2 hours at pH 2 was less than 15%.

The product inhibited the growth of *P. vulgaris* at a concentration of 1 in 20,000, of *E. coli* at a concentration of 1 in less than 4,000 of *S. typhi* at a concentration of 1 in 4,000, of *Staph. aureus* at a concentration of 1 in 8,000,000 and of *B. subtilis* at a concentration of 1 in 800,000.

*Example 2.—Phenylpenicillin*

Procedure A was repeated using benzoyl chloride in place of phenoxyacetyl chloride. Both the extracted fermentation liquor and the aqueous solution of the reaction product were assayed by the method described in Example 3, with the following results:

| | Activity (International Units) |
|---|---|
| Extracted fermentation liquor (volume 50 ml.) | 350 |
| Reaction product (volume 70 ml.) | 875 |

It will be seen that the activity was 2.5 times greater after the reaction with benzoyl chloride than before.

The free penicillins can be obtained from the sodium salts in each case by acidification.

In the foregoing examples the sodium salt has been prepared but it is to be understood that, if desired, other salts, e.g., potassium and calcium salts, may be obtained by similar means.

*Example 3*

The use of 4-aminobenzoyl chloride and 4-nitrobenzoyl chloride in the procedure of Example 1 in place of benzoyl chloride produced 4-aminophenylpenicillin and 4-nitrophenylpenicillin respectively. Each inhibited *Staph. aureus* at a concentration of 1 in 12,000,000.

*Example 4*

To 1.56 grams (0.0185 mole) sodium bicarbonate dissolved in 10 ml. water in an ice-bath there was added 1.0 gm. (0.00463 mole) 6-aminopenicillanic acid. When the acid had dissolved, the solution was shaken with 1.09 gm. (0.0046 mole) 3,5-dinitrobenzoyl chloride in 40 ml. chloroform for fifteen minutes. The aqueous layer was separated, washed with chloroform and then adjusted to pH 5–6 with glacial acetic acid. To this aqueous phase was added a solution of 1.0 gm. (0.00506 mole) dibenzylamine in 20 ml. water acidified to pH 5 with acetic acid. The dibenzylamine salt of 3,5-dinitrophenylpenicillin precipitated in crystalline form on addition of a little acetic acid and was collected, slurried in 5 ml. dry acetone, dried and found to weigh 1.5 gm., to melt at 120–123° C. and to inhibit *Staph. aureus* Smith at a concentration of 1.24 mcg./ml.

This product can also be named dibenzylammonium 6-(3,5-dinitrobenzamido)penicillanate.

*Example 5*

To a solution of 1 gm. (0.00463 mole) 6-aminopenicillanic acid in 20 ml. water and 1.56 gm. (0.0185 mole) sodium bicarbonate there was added 1.75 g. (0.01 mole) o-chlorobenzoyl chloride. The mixture was shaken for two minutes and washed with ether. The aqueous solution was adjusted to pH 2 with dilute sulfuric acid and the product, 2-chlorophenylpenicillin, was extracted into ether. To the ethereal solution after it had been dried over anhydrous $Na_2SO_4$ there was added a solution of 1.5 gm. potassium 2-ethylhexanoate in 4.0 ml. dry n-butanol. The potassium salt of 2-chlorophenylpenicillin, also called potassium 6-(2-chloro-benzamido)penicillanate, precipitated and was collected, dried over $P_2O_5$ and found to weigh 1.0 gm., to be soluble in water and to inhibit *Staph. aureus* Smith at a concentration of 0.3 mcg./ml.

*Example 6* o-Toluic acid (1.36 gm., 0.01 mole), isobutyl chloroformate (1.36 gm., 1.31 ml., 0.01 mole) triethylamine (1.54 ml., 0.011 mole) and 20 ml. p-dioxane were mixed together at 3–5° C. and stirred 30 minutes at 3–5° C. To this solution there was then added a solution of 6-aminopenicillanic acid (2.16 gm., 0.01 mole) and triethylamine (1.4 ml., 0.01 mole) in 20 ml. water. After stirring one hour, 20 ml. ice water was added and the pH was adjusted to pH 8. The solution was extracted with ether and then acidified to pH 2 with a 1:5 dilution of sulfuric acid. The product 2-methylphenylpenicillin (also called 6-(o-toluamido)penicillanic acid or o-tolylpenicillin or 6-(2-methylbenzamido)penicillanic acid), was twice extracted from the aqeous solution into ether. The ethereal extracts were combined, washed with water, dried over anhydrous $Na_2SO_4$, and treated with 5 ml. of a dry n-butanol solution of potassium 2-ethylhexanoate (about 0.37 gm./ml.) to form potassium o-tolylpenicillin which was recovered as a gum, and converted by drying overnight in vacuo over $P_2O_5$ to a brown hydroscopic solid which melted at 115–120° C. with decomposition, showed the presence of β-lactam structure by infrared analysis, was soluble in water and was found to inhibit *Staph. aureus* Smith at a concentration of 0.312 mcg./ml.

*Example 7* p-Hydroxybenzoic acid (2.07 gm., 0.015 mole) was dissolved in 20 ml. p-dioxane and 2 ml. acetone chilled to 3–5° Co.; upon addition of triethylamine (2.12 ml., 0.0151 mole) a gum formed which dissolved upon addition of isobutyl chloroformate (2.0 ml., 0.015 mole). To this solution there was added a solution prepared at 3–5° C. by mixing 6-aminopenicillanic acid (3.24 gm., 0.015 mole) and triethylamine (2.1 ml., 0.015 mole) in 20 ml. water. The mixed solutions were stirred one hour at 3–5° C., diluted with cold water and extracted with ether. The aqueous phase was then adjusted to pH 2 and the product, 6-(p-hydroxybenzamido)penicillanic acid, also called 4-hydroxyphenylpenicillin, was twice extracted into ether. To the combined ethereal extracts after washing with cold water and drying over anhydrous $Na_2SO_4$ was added 5 ml. of a dry n-butanol solution of potassium 2-ethylhexanoate (about 0.37 gm./ml.). The potassium 4-hydroxyphenylpenicillin separated as an oil which solidified on trituration with ether and was collected, dried in vacuo over $P_2O_5$ and found to weigh 1.5 gm., to melt at 191° C. with decomposition, to be soluble in water and to inhibit Staph. aureus Smith at a concentration of 0.62 mcg./ml.

Example 8

6-aminopenicillanic acid (2 gm., 0.00926 mole) anhydrous sodium bicarbonate (2.52 gm., 0.03 mole) and 40 ml. water were stirred at room temperature to give a solution to which 10 ml. acetone was added. There was then added dropwise over a period of ten minutes a solution of 3,4,5-trimethoxybenzoyl chloride (2.67 gm., 0.01155 mole) in 20 mol. acetone (analytical reagent grade). Reaction occurred as evidenced by slow evolution of bubbles. The solution was stirred for one hour at room temperature and extracted twice with ether. The solution was then covered with 50 ml. ether, chilled to 10° C. and acidified with 10% phosphoric acid. After mixing, the ether phase containing the product, 3,4,5-trimethoxyphenylpenicillin (also called 6-(3,4,5-trimethoxybenzamido)penicillanic acid), was separated, filtered through anhydrous $Na_2SO_4$ and treated with 7 ml. of a dry n-butanol solution of potassium 2-ethylhexanoate (0.373 gm./ml.). The potassium 3,4,5-trimethoxyphenylpenicillin thus formed separated as an oil. After decanting the ether and triturating with fresh ether and then drying in vacuo over $P_2O_5$, the product was obtained as a white water-soluble powder weighing 2.75 gm. and containing a β-lactam ring by infrared analysis. Melting point data: Started to darken gradually above 135° C. and then turned black with some bubbling at 165–170° C. The product inhibited Staph. aureus Smith at a concentration of 1.25 mcg./ml.

Example 9

Triethylamine (2.02 gm., 2.8 ml., 0.020 mole) was added dropwise to a cooled, stirred suspension of p-toluic acid (2.72 gm., 0.020 mole) in 40 ml. dioxane (dried over sodium), followed by the addition of isobutylchloroformate (2.73 gm., 0.020 mole) over 5–10 minutes at 12–13° C. The solution was stirred about 15 minutes, lowering the temperature to about 8° C. and then there was added over about ten minutes a solution of 6-aminopenicillanic acid (4.35 gm., 0.020 mole) in 40 ml. water and 5.5 ml. triethylamine. The mixture was stirred in an ice bath for about one hour and then at room temperature for an additional hour. After adding chilled water, the reddish solution was extracted twice with ether, removing some color, covered with 100 ml. ether, adjusted to pH 2 with 5 M sulfuric acid, mixed and the ether separated. This ethereal extract was combined with two additional ether extracts (100 ml.) and the combined extracts containing the product, p-tolylpenicillin or 6-(4-methylbenzamido)penicillanic acid, were washed with cold water and dried five minutes over $Na_2SO_4$. After removal of the drying agent by filtration, the addition of 9.7 ml. of dry n-butanol containing potassium 2-ethylhexanoate (0.373 gm./ml.) precipitated potassium 6-(4-methylbenzamido)penicillanate as a gum which solidified on trituration with ether and was collected, dried in vacuo over $P_2O_5$, found to weigh 4.05 gm., to melt at 163–165° C. (D), to contain the β-lactam group by infrared analysis and to inhibit Staph. aureus Smith at a concentration of 1.25 mcg./ml.

Example 10

To 6-aminopenicillanic acid (3.24 gm., 0.015 mole) which had been dissolved in 30 ml. ice cold bicarbonate solution (4.8 gm. of $NaHCO_3$ in 30 ml. of water) was added dropwise 0.016 mole, 2.80 gm., of p-chlorobenzoyl chloride in 50 ml. reagent grade acetone. After stirring 30 minutes at 0° C. and 30 minutes at room temperature, 5 gm. activated charcoal (Darco) was added and then removed by vacuum filtration 15 minutes later. The filtrate containing the sodium 6-(4-chlorobenzamido)penicillanate, was washed with two 100 ml. portions of ether, and adjusted to pH 2 with 5 N sulfuric acid. The 6-(4-chlorobenzamido)penicillanic acid was extracted into ether which was dried over anhydrous $Na_2SO_4$. Addition of 9.4 ml. of dry n-butanol containing 0.374 gm./ml. potassium 2-ethylhexanoate followed by standing ten minutes in an ice bath precipitated solid, water-soluble potassium 6-(4-chlorobenzamido)penicillanate which was dried in vacuo over $P_2O_5$ and found to weigh 1.4 gm., to melt at 174–176° C. (D.), to be soluble in water and to inhibit Staph. aureus Smith at a concentration of 0.31 mcg./ml.

Example 11

One gram of 6-aminopenicillanic acid was dissolved in 15 ml. water containing 1.56 gm. sodium bicarbonate. A total of 0.98 gm. 3,4-dichlorobenzoyl chloride was added to the solution and the reaction mixture was shaken for 15 minutes and then heated on a steam bath, forming the sodium salt of the product, 3,4-dichlorophenylpenicillin. Addition of a solution of one gram of dibenzylamine in acetic acid precipitated the debenzylamine salt of 3,4-dichlorophenylpenicillin which was collected, found to weigh 1.5 gm., to contain a β-lactam group by infrared analysis and to inhibit Staph. aureaus Smith at a concentration of 0.312 mcg./ml.

The product is also named dibenzylammonium 6-(3,4-dichlorobenzamido)penicillanate.

Example 12

To a solution of one gram 6-aminopenicillanic acid and 1.56 gm. sodium bicarbonate dissolved in 10 ml. water was added a solution of 1.00 g. 3-nitrobenzoyl chloride in 20 ml. chloroform. The mixture was shaken at room temperature for 45 minutes and then extracted three times with chloroform (20 ml.). After bubbling air through the aqueous phase to remove the last of the chloroform, the pH was adjusted to 5 with acetic acid. Addition of 1 gm. dibenzylamine as the acetate in 15 ml. water precipitated the product, dibenzylammonium 6-(3-nitrobenzamido)penicillanate, as a yellow gum which crystallized when the solution was decanted and replaced with more water. The product was collected, dried and found to weigh 1.14 gm., to melt at 90–93° C. (sl. decomp.), to contain a β-lactam ring by infrared analysis, to be insoluble in water and soluble in acetone and to inhibit Staph. aureus Smith at a concentration of 0.625 mcg./ml.

Example 13.—Preparation of sodium salt of 2,4,6-trimethoxyphenylpenicillin 2,4,6-trimethoxybenzoic acid (2.57 g., 0.012 mole) and thionyl chloride (1.8 ml., 0.024 mole) were mixed at room temperature in a flask fitted with a calcium chloride protected air condenser. After standing for 1 hour a high vacuum was applied to remove excess thionyl chloride and the residue was dissolved in anhydrous alcohol-free chloroform. The residue left after re-evaporation under high vacuum was dissolved in anhydrous alcohol-free chloroform (10 ml.) and the solution added, during 15 mins., to a stirred mixture of 6-aminopenicillanic acid (2.16 g., 0.01 mole), triethylamine (2.8 ml., 0.02 mole) and anhydrous chloroform (20 ml.). After stirring for a further 1 hour the mixture was extracted with 1 N, hydrochloric acid (9 ml.) to give an aqueous phase of pH 2, washed with water (20 ml.), and then extracted with 3% w./v. sodium bicarbonate solution (26 ml.) to give an aqueous phase of pH 7. Evaporation of the last aqueous phase at room temperature under high vacuum gave a residue which was dried under high vacuum over phosphorus pentoxide to give a light buff powder (2.72 g.) which was found to inhibit Staph. Oxford at a concentration of 2.5 mcg./ml., Staph. 1 at 12.5 mcg./ml., and Staph. 2 at 6.0 mcg./ml.

*Example 14*

The procedure of Example 6 was followed using seven times as much of each reagent and solvent and replacing the o-toluic acid with 0.07 mole (9.70 gm.) salicyclic acid to produce potassium 6-salicylamidopenicillanate (also called potassium 6-(2-hydroxybenzamido)penicillanate) as a brittle solid, 10.7 gm., which melted at 80° C. with foaming and decomposed on heating above 150° C. and which inhibited the growth of *Staph. aureus* Smith at a concentration of 1.56 mcg./ml.

*Example 15* p-Ethoxybenzoic acid (4.62 gm., 0.0278 mole) was dissolved in 15 ml. pure, dry dimethylformamide. After adding 4.0 cc. (0.028 mole) dry triethylamine and cooling to 0° C. there was added 3.64 cc. (0.0278 mole) isobutyl chloroformate. The solution was stirred 20 minutes and 50 ml. acetone was added. There was next added a solution cooled to 0° C. of 6-aminopenicillanic acid (6.00 gm., 0.0278 mole) in 60 ml. water and 4.0 cc. triethylamine. Carbon dioxide evolution was slow so the ice bath was removed and the mixture was stirred one hour. At the end of this time the pH was 6.0. A solution of 2.0 gm. $NaHCO_3$ in 60 ml. cold water was added and the solution was twice extracted with 150 ml. cold ether which was discarded. The aqueous phase was cooled to 0° C., stirred, covered with 150 ml. cold ether and acidified with 10 ml. cold 6 N hydrochloric acid. The product, 6-(4-ethoxybenzamido)penicillanic acid, was quickly extracted into the ether and after separation the aqueous phase was again extracted with another 150 ml. cold ether. The combined ethereal extracts were washed with 50 ml. cold water, dried over anhydrous $Na_2SO_4$ and filtered. Addition of 25 cc. of 40% potassium 2-ethylhexanoate in dry n-butanol precipitated some of the potassium salt of the product as five white needles and more upon the addition of 500 cc. dry ether as a gum which was obtained on triturating twice with dry ether and twice with lower alkanes (Skellysolve B) and drying in vacuo at 28° C. for 24 hours as a brittle amorphous glass, 8.19 gm., which inhibited *Staph. aureus* Smith.

*Example 16*

To 2,6-dimethoxybenzoic acid (25.5 g., 0.14 mole) is added thionyl chloride (20.2 ml., 0.28 mole) and the mixture is allowed to react at room temperature for 10 minutes. The mixture is then heated in an oil bath, the temperature of which is raised slowly to 60° C. and held at this temperature for several minutes, until the solid has dissolved. The reaction mixture is then allowed to cool in the oil bath and concentrated in vacuo. The almost colorless residue crystallizes and is dried in vacuum over $P_2O_5$ and NaOH and is found to weigh 28.1 g. and has a melting point of 63–67° C.

2,6-dimethoxybenzoyl chloride can be distilled in vacuo (B.P. 172–174°/25 mm.), but in large scale preparations we prefer not to distill the product because of the losses involved.

In the preparation of 2,6-dimethoxyphenyl penicillin, dry triethylamine (138 ml.) is added to a stirred suspension of 6-aminopenicillanic acid (108 g.) in dry alcohol-free chloroform (750 ml.), and the mixture is cooled in a bath of ice-water while a solution of 2,6-dimethoxybenzoyl chloride (100 g. of undistilled product) in dry alcohol-free chloroform (750 ml.) is added in a steady stream over 10 minutes. Additional triethylamine may be added if the reaction mixture is found to be acidic. The ice-water bath is removed and the mixture stirred for 1 hr., at room temperature. The mixture is shaken with sufficient N hydrochloric acid to give an aqueous phase of pH 2.5 and then the layers are separated, only the chloroform layer being retained. Unreacted 6-aminopenicillanic acid (17 g.) is separated in the aqueous phase and is collected by filtration. The chloroform layer is then shaken with sufficient N sodium bicarbonate to give a feebly alkaline aqueous phase (pH 7.2) which is separated and combined with a single water (50 ml.) washing of the chloroform layer. The combined aqueous layers are concentrated at low temperature and pressure until they weigh 171 g. (it is estimated that the water present at this stage is 49 g.). The concentrate is titrated with dry acetone (450 ml.) until all the syrup has dispersed and then the solid impurity which has separated is removed by filtration, and washed with two 50 ml. portions of acetone containing 10% of water. The filtrate is then diluted with dry acetone (2500 ml.), stirred for about 10 minutes and filtered, when again only the filtrate is retained. Dry ether (750 ml.) is added to the filtrate, crystallization is induced by scratching, and after being kept in the refrigerator for some hours, the product is collected by filtration.

The product is a white powder weighing 73.1 g. This material is believed to be at least 90% pure 2,6-dimethoxyphenylpenicillin, which may also be referred to as 6-(2,6-dimethoxybenzamido)penicillanic acid.

The product can be recrystallized by dissolution in wet acetone (containing 10–20% water) followed by dilution with dry acetone until the water content is reduced to not more than 7%. A specimen is recrystallized once as above and is dried in a vacuum desiccator over $P_2O_5$ and analysed for the monohydrate. (Found: C, 48.3; H, 5.3; N, 6.4; S, 7.2%. Calculated for $C_{17}H_{19}O_6N_2SNa$, $H_2O$: C, 48.6; H, 5.0; N, 6.7; S, 7.6%). The water of crystallization appears to be removed by drying at 115° in vacuo for 1 hr., but the anhydrous salt takes up water from the air so rapidly that an accurate analysis on it is difficult. (Found: C, 49.4; H, 5.3; N, 7.1; S, 7.7. Calculated for $C_{17}H_{19}O_6N_2SNa$: C, 50.7; H, 4.7; N, 7.0; S, 8.0%).

2,6-dimethoxyphenylpenicillin can also be isolated as the potassium salt using the potassium 2-ethylhexoate technique as described above.

*Example 17*

(a) *Preparation of potassium salt of 6-(2,6-dimethoxybenzamido)penicillanic acid.*—In another method for the preparation of 2,6-dimethoxyphenylpenicillin, a mixture of 6-aminopenicillanic acid (2.15 g.), triethylamine (2.8 ml.) and anhydrous acetone (30 ml.) was stirred at room temperature while a solution of 2,6-dimethoxybenzoyl chloride (2 g.) in anhydrous acetone (30 ml.) was added during 5 minutes. After being stirred for a further one hour, the mixture was diluted with iced water (100 ml.) and washed with three separate 50 ml. portions of ether. The aqueous phase was adjusted to pH 2 with 1 N hydrochloric acid (10 ml.) and extracted with three separate 50 ml. portions of ether. The ether extracts were dried over anhydrous sodium sulphate and treated with 1 N potassium 2-ethylhexoate in n-butanol (10 ml.). The precipitated gum was washed twice by decantation with two separate 100 ml. portions of anhydrous ether and dried in vacuum over $P_2O_5$ to give the potassium salt of the product, 2,6-dimethoxyphenylpenicillin, as a white powder (2.6 g.). This penicillin may also be termed 6-(2,6-dimethoxybenzamido)penicillanic acid.

The substance was destroyed by the enzyme penicillinase many times more slowly than was benzylpenicillin. Its activity against a typical benzylpenicillin-sensitive *Staphylococcus* (Staph. Oxford) and two typical benzylpenicillin-resistant strains is compared with the activity of benzylpenicillin in the following table in which the figures shown represent the minimum inhibitory concentration in mcg./ml.

|  | Staph. Oxford | Resistant Strain 1 | Resistant Strain 2 |
| --- | --- | --- | --- |
| 2,6-Dimethoxyphenylpenicillin | 0.6 | 2.5 | 5.0 |
| Benzylpenicillin | 0.005 | 50.0 | 50.0 |

Pharmacologic and toxicologic studies on 2,6-dimethyloxyphenylpenicillin have shown it to be a nontoxic, non-irritant material which is readily absorbed following initramuscular administration. Intravenous administration of large doses to anesthetized dogs resulted in negligible effects on cardiovascular and autonomic function. Rats and dogs tolerated daily parenteral doses of 200 mg./kg. for three weeks without obvious alterations in growth rate or laboratory findings, respectively.

(b) *Preparation of sodium salt of 6-(2,6-dimethoxybenzamido)penicillanic acid.*—To a stirred suspension of 6-aminopenicillanic acid (540 g.) in dry alcohol-free chloroform (3.75 l.) was added dry triethylamine (697 ml.), and the mixture stirred for 10 minutes at room temperature. It was then cooled in a bath of crushed ice while a solution of 2,6-dimethoxybenzoyl chloride (500 g.) in dry alcohol-free chloroform (3.75 l.) was added in a steady stream over 20 minutes. When all the acid chloride had been added the cooling bath was removed and the mixture stirred for 1 hour at room temperature. The mixture was stirred vigorously and sufficient dilute hydrochloric acid (2.3 l. of 0.87 N.) was added to give an aqueous layer of pH 2.5. The mixture was filtered, the layers separated, and only the chloroform layer was retained. This was stirred vigorously while further dilute hydrochloric acid (0.69 l. of 0.87 N.) was added to give an aqueous layer of pH 1. The layers were separated and again only the chloroform layer was retained. Then the chloroform layer was stirred vigorously while sufficient sodium bicarbonate solution (3.2 l. of 0.97 N.) was added to give an aqueous layer of pH 6.7–7.0. The layers were separated and both were retained. The chloroform layer was stirred vigorously while sufficient sodium bicarbonate solution (50 ml. of 0.97 N.) was added to give an aqueous layer of pH 7.7, and again the layers were separated. The two bicarbonate extracts were combined, washed with ether (1 l.), and then concentrated at low temperature and pressure until the concentrate weighed 1415 g. The concentrate was treated with dry acetone (22 l.), the mixture well mixed, and then filtered to remove precipitated solid impurities. Further dry acetone (4 l.) was added to the filtrate, then the product started to crystallize slowly. Crystallization was allowed to proceed at a temperature between 0 and 3° C. for 16 hours and then the product (563 g.) was collected by filtration. Dry ether (7.5 l.) was added to the filtrate, and after several hours a second crop (203 g.) of solid was collected. The two crops were combined to give sodium 2,6-dimethoxyphenylpenicillin monohydrate (766 g., 73%) as a white crystalline solid $[a]_D^{25}=219°$ (c. 5.0 in water).

A portion of this material was recrystallized by dissolution in moist acetone followed by addition of dry acetone. It then had $[a]_D^{20}=230°$ (c. 5.0 in water).

(Found: C, 48.9; H, 5.2; N, 7.1; S, 8.0; Na, 5.5; $H_2O$, 4.3. $C_{17}H_{19}N_2O_6SNa,H_2O$ requires C, 48.6; H, 5.0; N, 6.7; S, 7.6; Na, 5.5; $H_2O$, 4.3%).

(c) *Preparation of the procaine salt of 6-(2,6-dimethoxybenzamido)penicillanic acid.*—Solutions of the sodium salt (8.4 g.) in water (15 ml.) and of procaine hydrochloride (5.45 g.) in water (8 ml.) were mixed, whereupon a bulky white solid quickly precipitated. The mixture was set aside in the refrigerator overnight and then filtered. The product was washed with water and then dried in a vacuum desiccator to give the monohydrate of the procaine salt as a white powder, M.P. 138–139° C. (decomp.). Yield 11.4 g. (Found: C, 56.4; H, 6.9; N, 8.8; S, 4.9. $C_{30}H_{40}O_8N_4S,H_2O$ requires C, 56.8; H, 6.9; N, 8.8; S, 5.0%).

The product inhibited Staph. Oxford at a concentration of 1.25 mcg./ml., the benzylpenicillin-resistant Staph. 1 at 2.5 mcg./ml., and the benzylpenicillin-resistant Staph. 2 at 2.5 mcg./ml.

(d) *Preparation of N,N'-dibenzylethylenediamine salt of 6-(2,6-dimethoxybenzamido)penicillanic acid.*—Solutions of the sodium salt (14 g.) in water (30 ml.) and of N,N'-dibenzylethylenediamine diacetate (6 g.) in water (40 ml.) were mixed to give an immediate white precipitate. The mixture was set aside in the refrigerator overnight and then filtered. The product was washed with water and then dried in a vacuum desiccator to give the trihydrate of the N,N'-dibenzylethylenediamine salt as a white powder, M.P. 127–128° C. (decomp.). Yield 15.1 g. (Found: C, 57.1; H, 6.3; N, 8.3; S, 6.2.

$$C_{50}H_{60}O_{12}N_6S_2,3H_2O$$

requires C, 56.9; H, 8.3; N, 8.0; S, 6.1).

The product inhibited Staph. Oxford at a concentration of 0.5 mcg./ml., and the benzylpenicillin-resistant Staph. 2 at 2.5 mcg./ml.

Example 18.—*Preparation of potassium salt of 2,4,6-trimethylphenylpenicillin*

A solution of mesitoyl chloride (5.48 g., 0.03 mole) in anhydrous acetone (40 ml.) was added, during about 15 mins., to a stirred mixture of 6-aminopenicillanic acid (6.45 g., 0.03 mole), triethylamine (8.4 ml., 0.06 mole) and anhydrous acetone (50 ml.). After stirring for a further 2 hours, the mixture was diluted with iced water (150 ml.) and extracted with ether (3×100 ml.). The aqueous phase was carefully adjusted to pH 2 with 1 N. hydrochloric acid (30 ml.) and extracted with ether (3×200 ml.). After drying over anhydrous magnesium sulphate, the ether extracts were treated with a 2 N. solution of potassium 2-ethylhexoate in n-butanol (15 ml.) and then diluted with anhydrous ether (500 ml.). After standing at 0° overnight the ether was decanted from the precipitated gum, which was then washed with dry ether by decantation and dried under high vacuum over $P_2O_5$ to a light brown powder (3.36 g.).

The product inhibited Staph. Oxford at a concentration of 0.6 mcg./ml., the benzylpenicillin-resistant Staph. 1 at 25 mcg./ml., and the benzylpenicillin-resistant Staph. 2 at 25 mcg./ml.

Example 19.—*Preparation of potassium salt of 2,6-dichlorophenylpenicillin*

This compound was prepared by the method used in Example 6, using: 2,6-dichlorobenzoyl chloride (9.4 g., 0.045 mole), 6-aminopenicillanic acid (9.68 g., 0.045 mole) and triethylamine (12.8 ml., 0.09 mole). The product, the potassium salt of 6-(2,6-dichlorobenzamido)-penicillanic acid, was obtained as a light brown powder (9.14 g.); which was found to inhibit Staph. Oxford at a concentration of 0.5 mcg./ml., Staph. 1 at 12.5 mcg./ml., and Staph. 2 at 6.5 mcg./ml.

Example 20.—Preparation of sodium salt of 2,6-diethoxyphenylpenicillin

Thionyl chloride (3.2 ml., 0.0433 mole) was added to 2,6-diethoxybenzoic acid (4.55 g., 0.0217 mole) contained in a flask fitted with a calcium chloride protected air condenser. After the reaction had subsided (30 mins.) the mixture was warmed at 80° C. for a further 30 mins. and then the excess thionyl chloride removed under high vacuum at about 30° C. The crude acid chloride residue was dissolved in anhydrous acetone (40 ml.) and added, during 15 mins., to a stirred mixture of 6-aminopenicillanic acid (4.68 g., 0.0217 mole), triethylamine (6.6 ml., 0.0433 mole) and anhydrous acetone (65 ml.). After stirring for a further 1 hour the mixture was diluted with iced water (100 ml.) and ether extracted (3×50 ml.). The aqueous phase was then acidified to pH 2 with 1 N. hydrochloric acid (21.6 ml.) and extracted with ether (3×50 ml.). The ether extracts were combined and shaken with water (50 ml.) and increasing amounts of 3% w./v. sodium bicarbonate solution (5.8 ml. in all) until the aqueous phase was at pH 7. After separating, the aqueous phase was washed with ether (2×50 ml.) and evaporated to dryness under high vacuum at room temperature. The residue was dried over $P_2O_5$ under high vacuum to give a white powder (6.8 g.) which was found to inhibit Staph. Oxford at a concentration of 2.5 mcg./ml., Staph. 1 at 6 mcg./ml., and Staph. 2 at 6 mcg./ml.

The 2,6-diethoxybenzoic acid, M.P. 130–132° C., used in the above experiment was prepared by alkaline hydrolysis of methyl 2,6-diethoxybenzoate, which was itself obtained by treating methyl 2,6-dihydroxybenzoate with diethyl sulfate and potassium carbonate in acetone.

Example 21

Using the procedure of Example 20 the sodium salt of 2,6-di-n-butoxybenzoic acid (2.66 g., 0.01 mole), thionyl chloride (1.5 ml., 0.02 mole), 6-aminopencillanic acid (2.16 g., 0.0 mole) and triethylamine (2.8 ml., 0.02 mole) as a white powder (2.2 g.).

The product inhibited Staph. Oxford at a concentration of 5 mcg./ml., Staph. 1 at 6 mcg./ml., and Staph. 2 at 6 mcg./ml.

The 2,6-di-n-butoxybenzoic acid, M.P. 81–83° C., used in the above experiment was prepared by alkaline hydrolysis of methyl 2,6-di-n-butoxybenzoate, which was itself obtained b ytreating methyl 2,6-dihydroxybenzoate with n-butyl bromide and potassium carbonate in acetone.

Example 22

Using the procedure of Example 20 the sodium salt of 2,6-dibenzyloxyphenylpenicillin was prepared from 2,6-dibenzyloxybenzoic acid (3.34 g., 0.0 mole), thionyl chloride (1.5 ml., 0.02 mole), 6-aminopenicillanic acid (2.16 g., 0.01 mole) and triethylamine (2.8 ml., 0.02 mole) as a white powder (2.13 g.).

The product inhibited Staph. Oxford at a concentration of 1.25 mcg./ml., Staph. 1 at 2.5 mcg./ml., and Staph. 2 at 2.5 mcg./ml.

The 2,6-dibenzyloxybenzoic acid, M.P. 124–126° C., used in the above experiment was prepared by alkaline hydrolysis of methyl 2,6-dibenzyloxybenzoate, which was itself obtained by treating methyl 2,6-dihydroxybenzoate with benzyl chloride and potassium carbonate in acetone.

Example 23.—Preparation of sodium salt of 2,3,6-trimethoxyphenylpenicillin

A solution of 2,3,6-trimethoxybenzoyl chloride (1 g., 0.0043 mole) in anhydrous alcohol-free chloroform (10 ml.) was added, during 10 mins., to a stirred mixture of 6-aminopenicillanic acid (0.94 g., 0.0043 mole), triethylamine (1.2 ml., 0.0086 mole) and anhydrous chloroform (20 ml.). After stirring for a further 1 hour the mixture was shaken with 1 N. hydrochloric acid (10 ml.) and the chloroform layer separated and washed with water (2×10 ml.). The chloroform solution was then shaken with water (10 ml.) and sufficient 3% w./v. sodium bicarbonate solution (9.4 ml.) to give an aqueous phase of pH 7. Evaporation of the aqueous phase under high vacuum at room temperature left a residue which was dried under high vacuum over phosphorus pentoxide to give a buff powder (0.93 g.).

The product inhibited Staph. Oxford at a concentration of 1.25 mcg./ml., Staph. 1 at 5.0 mcg./ml., and Staph. 2 at 5.0 mcg./ml.

Example 24.—Preparation of sodium salt of 2,4,6-tribromophenylpenicillin

Solution of 2,4,6-tribromobenzoyl chloride (3.78 g., 0.01 mole) in anhydrous alcohol-free chloroform (40 ml.) was added to a stirred mixture of 6-aminopenicillanic acid (2.16 g., 0.01 mole), triethylamine (2.8 ml., 0.02 mole) and anhydrous alcohol-free chloroform (50 ml.). After stirring for a further 2 hours the mixture was washed with 1 N. hydrochloric acid (20 ml.) and filtered from a little insoluble material. The chloroform layer was then washed with water (20 ml.) and shaken with sufficient 3% w./v. sodium bicarbonate solution (25 ml.) to give a neutral emulsion (pH 7), which was evaporated to dryness at room temperature under high vacuum. The residue was dried under high vacuum over phosphorus pentoxide, and washed by decantation with anhydrous ether (2×50 ml.) to give the product (3.8 g.) as a light buff powder.

The product inhibited Staph. Oxford at a concentration of 5 mcg./ml., Staph. 1 at 25 mcg./ml., and Staph. 2 at 25 mcg./ml.

Example 25.—Preparation of sodium salt of 2,6-di-n-propoxyphenylpenicillin

This product, 2,6-di-n-propoxyphenylpenicillin (sodium salt), was prepared by the method of Example 20, using 2,6-di-n-propoxybenzoic acid (2.86 g., 0.012 mole), thionyl chloride, (1.8 ml., 0.024 mole), 6-aminopenicillanic acid (2.16 g., 0.01 mole) and triethylamine (2.8 ml., 0.02 mole) and obtained as a white powder (2.0 g.).

The product inhibited Staph. Oxford at a concentration of 5 mcg./ml., Staph. 1 at 12.5 mcg./ml., and Staph. 2 at 12.5 mcg./ml.

The 2:6-di-n-propoxybenzoic acid, M.P. 54–56° C., used in this experiment was prepared by alkaline hydrolysis of methyl 2:6-di-n-propoxybenzoate, which was itself obtained by treating methyl 2:6-dihydroxybenzoate with n-propyl bromide and potassium carbonate in acetone.

Example 26

Using the procedure of Example 13 2,6-dimethoxy-4-methylphenylpenicillin (sodium salt) was prepared from 2,6-di-methoxy-4-methylbenzoic acid (2.16 g., 0.011 mole), thionyl chloride (2 ml.), 6-aminopenicillanic acid (2.16 g., 0.01 mole) and triethylamine (2.8 ml., 0.02 mole) as a white powder (2.22 g.).

The product inhibited Staph. Oxford at a concentration of 1.25 mcg./ml., Staph. 1 at 5 mcg./ml., and Staph. 2 at 5 mcg./ml.

Example 27

Using the procedure of Example 21, 4,6-diethyl-2-methoxybenzoyl chloride (2.1 g., 0.0093 mole), 6-aminopenicillanic acid (2 g., 0.0093 mole) and triethylamine (2.6 ml., 0.0186 mole) as a white powder (1.4 g.).

The product inhibited Staph. Oxford at 2.5 mcg./ml., Staph. 1 at 6 mcg./ml., and Staph. 2 at 6 mcg./ml.

The 4:6-diethyl-2-methoxybenzoyl chloride used in this experiment was prepared as a crude oil by the action of thionyl chloride on 4:6-diethyl-2-methoxybenzoic acid, M.P. 112–113° C. This acid was itself obtained by the action of carbon dioxide on a lithium derivative prepared from 3:5-diethylanisole and butyl lithium.

Example 28

Using the procedure of Example 13, 6-ethoxy-2-methoxyphenylpenicillin (sodium salt) was prepared from 6-ethoxy-2-methoxybenzoic acid (3.15 g., 0.0164 mole), thionyl chloride (3.5 ml.), 6-aminopenicillanic acid (3.35 g., 0.016 mole) and triethylamine (4.8 ml., 0.032 mole) as a white powder (3.78 g.).

The product inhibited Staph. Oxford at a concentration of 1.25 mcg./ml., Staph. 1 at 2.5 mcg./ml., and Staph. 2 at 5 mcg./ml.

The 2-ethoxy-6-methoxybenzoic acid used in this experiment was prepared by oxidizing 2-ethoxy-6-methoxytoluene with potassium permanganate in pyridine. The 2-ethoxy-6-methoxy-toluene was itself prepared by the action of diethyl sulphate on 2-hydroxy-6-methoxytoluene.

Example 29.—Preparation of the potassium salt of 6-(2-methylthiobenzamido)penicillanic acid In the preparation of 2-methylthiobenzoyl chloride, a solution of thionyl chloride (7.3 ml.; 0.1 mole; 11.9 g.), 0.5 ml. pyridine, 100 ml. benzene, and 2-methylthiobenzoic acid (0.1 mole; 16.8 g.) is warmed on a steam bath until the reaction is completed. The solvent is then stripped at reduced pressure and the acid chloride residue crystallized by cooling.

In the preparation of 6-aminopenicillanic acid the acid chloride, prepared as described above, is dissolved in 75 ml. acetone and the resulting solution is added rapidly to a stirred solution at 20° C. of 6-aminopenicillanic acid (0.1 mole; 21.6 g.) sodium bicarbonate (0.3 mole; 25.2 g.), 75 ml. acetone, and 150 ml. water. A vigorous evolution of carbon dioxide occurs upon the mixing of the solutions and subsides after about ½ hour. The reaction mixture is chilled to about $-5°$ C. and extracted with three portions of methylisobutyl ketone, the extracts being discarded. The aqueous phase is then layered with methylisobutyl ketone, separated and acidified to pH 2 with 42% phosphoric acid. The aqueous acidic mixture in which the product is contained is then extracted twice with 200 ml. portions of methylisobutyl ketone. The methylisobutyl ketone extracts are combined and dried over anhydrous sodium sulfate, filtered, and treated with 50 ml. of an ether solution of potassium ethylhexanoate (0.081 mole of potassium ethylhexanoate) whereupon the product is separated as an oil. The solvent is decanted and the oil triturated with 2 portions of acetone and one portion of tertiary butyl alcohol whereupon the product is crystallized. The product is then collected by filtration and dried at room temperature in vacuo over $P_2O_5$. The product, the potassium salt of 6-(2-methylthiobenzamido)-penicillanic acid, is found to weigh 17.7 g., to decompose at 210–212° C., to contain the β-lactam structure as shown by infrared analysis, to inhibit Staph. aureus Smith at a concentration of 0.4 mcg./ml. and to exhibit versus the same organism upon intramuscular injection in mice a $CD_{50}$ of 9 mg./kg.

Example 30

A suspension of o-benzylthiobenzoyl chloride (0.1375 mole; 36.1 g.) in 150 ml. acetone is added rapidly to a mixture at 15° C. of sodium bicarbonate (0.413 mole; 34.7 g.), 6-amino-penicillanic acid (0.1375 mole; 29.7 g.), 206 ml. water and 100 ml. acetone. The reaction mixture was maintained at 20° C. for 2 hours with vigorous stirring. Carbon dioxide is evolved and a yellow precipitate is formed during the reaction. The precipitate is removed by filtration and the filtrate is extracted twice with 200 ml. portions of ether, the ether extracts being discarded. The aqueous phase is then layered with ether and acidified to pH 2 with 42% phosphoric acid. The acidified aqueous solution is then extracted with 400 ml. of ether in two portions and the ether extracts are dried over anhydrous sodium sulfate, filtered and treated with 50 ml. of an ether solution of potassium ethylhexanoate (0.082 mole of potassium ethylhexanoate) whereupon an oil separates. After chilling in ice the ether is decanted and the oil covered with 400 ml. of t-butanol whereupon crystallization of the product occurs. After 2 hours the solvent is decanted and the product dried in vacuo over $P_2O_5$. The product, the potassium salt of 6-(2-benzylthiobenzamido)penicillanic acid, is found to weigh 34.6 g., to bubble and swell at 85–90° C., to decompose at 200–205° C., to contain the β-lactam ring as shown by infrared analysis, to inhibit Staph. aureus Smith at a concentration of 0.4 mcg./ml. and to exhibit versus Staph. aureus Smith upon intramuscular injection in mice a $CD_{50}$ of 16 mg./kg.

Example 31

To 10.1 g. of 2-phenoxybenzoic acid in 200 ml. of dioxane and 7.6 ml. of triethylamine at 10° C. is added to 5.3 ml. of ethyl chloroformate with stirring for 20 minutes. A solution of 6-aminopenicillanic acid (10.8 gm.) in 7.6 ml. of triethylamine and 50 ml. of water is added all at once. The reaction mixture is stirred for 1 hour and then diluted with 500 ml. of water and extracted with ethylacetate. The aqueous phase is acidified to pH 2 with sulfuric acid and extracted with ethylacetate. The extract is then washed with water and 2.1 g. of potassium ethylhexanoate as a 40% solution in butanol. The solvent is then removed by evaporation and the precipitated crystalline product removed by filtration. The product, the potassium salt of 6-(2-phenoxybenzamido)-penicillanic acid, after drying is found to weigh 18 g., to decompose at 120–124° C., to contain the β-lactam ring as shown by infrared analysis, to inhibit Staph. aureus Smith at a concentration of 0.4 mcg./ml., and to exhibit versus Staph. aureus Smith upon intramuscular injection in mice a $CD_{50}$ of 18 mg./kg.

Example 32

Using the procedure of Example 31, 6-(pentachlorobenzamido)penicillanic acid is prepared from 10.6 gm. of pentachlorobenzoic acid and is found to weigh 10.0 gm., to decompose at 189–192° C., to contain the β-lactam ring as shown by infrared analysis and to inhibit Staph. aureus Smith at a concentration of 0.1 mcg./ml.

Example 33

Triethylamine (13.9 ml., 0.1 mole) is added to 2-phenylbenzoic acid (19.8 g., 0.1 mole) in tetrahydrofuran (150 ml.) at $-10°$ C. After 10 minutes ethylchloroformate (9.6 ml., 10.8 g., 0.1 mole) is added causing the temperature to rise to $-7°$ C. and thereafter 6-aminopenicillanic acid (21.6 g., 0.1 mole) in 40 ml. of water and 15 ml. of triethylamine is added. The reaction mixture is stirred 1½ hours in a cooling bath and for an additional 2 hours at room temperature. The reaction mixture is then diluted with water, made alkaline with saturated sodium bicarbonate solution, and extracted with methylisobutyl ketone. The aqueous phase is then acidified to pH 2 with 42% phosphoric acid and extracted with methylisobutyl ketone. The extract is then washed with water and to the extract is added 38 ml. (0.1 mole) of 40% potassium ethylhexanoate in n-butanol. After an hour the solvent is removed by evaporation in a rotary evaporator at 40° C. The resulting white solid is slurried with dry ether and the hygroscopic product collected by filtration and dried in vacuo over $P_2O_5$. The product, the potassium salt of 6-(2-phenylbenzamido)penicillanic acid, is found to weigh 37.0 gm., to decompose at 112–116° C., to contain the β-lactam ring as shown by infrared analysis, and to inhibit Staph. aureus Smith at concentrations below 0.001 percent by weight.

Example 34

To a solution of 2-methoxybenzoyl chloride (100.0 g.; 0.59 mole) in 800 ml. of dichloromethane is added a solution of 6-aminopenicillanic acid (128.0 g.; 0.59 mole)

triethylamine (118.0 g.; 1.18 mole) in 600 ml. of dichloromethane. The solution is stirred for 2 hours in an ice bath and then diluted with water. Fifty ml. of triethylamine is then added, the dichloromethane layer separated and resulting aqueous phase washed with ether and acidified to pH 2 with dilute sulfuric acid. The acidified aqueous solution is then extracted with ether, the ether extracts washed with water and dried over anhydrous sodium sulfate. The dried ether extract is then filtered and sodium 2-ethylhexanoate added with stirring whereupon a precipitate forms. The precipitate is collected by filtration and dissolved in 10 ml. of water and 100 ml. of acetone is added to give a clear solution. The solution is diluted with 2 l. of acetone whereupon the product is precipitated. The product, the sodium salt of 6-(2-methoxybenzamido)penicillanic acid, is collected by filtration, dried in vacuo over $P_2O_5$, found to weigh 36.0 g., to contain the $\beta$-lactam ring structure as shown by infrared analysis and to inhibit *Staph. aureus* Smith at a concentration of 0.4 mcg./ml.

*Example 35*

In the procedure of Example 9, the p-toluic acid is replaced by 0.020 mole p-sulfamyl benzoic acid, 3,4-dimethoxybenzoic acid, 4-methoxybenzoic acid, 3-methylbenzoic acid, 3-dimethylaminobenzoic acid, 2-methoxybenzoic acid, 2-chloro-3,4,5-trimethoxybenzoic acid, 2,4-dichlorobenzoic acid, 2-nitrobenzoic acid, 4-methylaminobenzoic acid, 2-acetamidobenzoic acid, 2,4-dimethylbenzoic acid, 2,4,5-trimethylbenzoic acid, 4-isopropylbenzoic acid, 3-bromobenzoic acid, 2-iodobenzoic acid, 2-ethylaminobenzoic acid, 2,5-dihydroxybenzoic acid, and 4-hydroxy-3-methoxybenzoic acid, 4-allylbenzoic acid, 4-allyloxybenzoic acid, 2-trifluoromethylbenzoic acid, 4-fluorobenzoic acid, 2-phenylthiobenzoic acid, and 2-benzylbenzoic acid, respectively, to produce the acids 6-(4-sulfamylbenzamido)penicillanic acid,
6-(3,4-dimethoxybenzamido)penicillanic acid,
6-(4-methoxybenzamido)penicillanic acid,
6-(3-methylbenzamido)penicillanic acid,
6-(3-dimethylaminobenzamido)penicillanic acid,
6-(2-methoxybenzamido)penicillanic acid,
6-(2-chloro-3,4,5-trimethoxybenzamido)penicillanic acid,
6 (2,4-dichlorobenzamido)penicillanic acid,
6-(2-nitrobenzamido)pencillanic acid,
6-(4-methylaminobenzamido)penicillanic acid,
6-(2-acetamidobenzamido)penicillanic acid,
6-(2,4-dimethylbenzamido)penicillanic acid,
6-(2,4,5-trimethylbenzamido)penicillanic acid,
6-(4-isopropylbenzamido)penicillanic acid,
6-(3-bromobenzamido)penicillanic acid,
6-(2-iodobenzamido)penicillanic acid,
6-(2-ethylaminobenzamido)penicillanic acid,
6-(2,5-dihydroxybenzamido)penicillanic acid,
6-(4-hydroxy-3-methoxybenzamido)penicillanic acid,
6-(4-allylbenzamido)penicillanic acid,
6-(4-allyloxybenzamido)penicillanic acid,
6-(2-trifluoromethylbenzamido)penicillanic acid,
6-(4-fluorobenzamido)penicillanic acid,
6-(2-phenylthiobenzamido)penicillanic acid, and
6-(2-benzylbenzamido)penicillanic acid, respectively, which were isolated as their solid, water-soluble potassium salts and found to inhibit *Staph. aureus* Smith at concentrations below 0.001 percent by weight.

*Example 36*

In the procedure of Example 9, the p-toluic acid is replaced by 0.02 mole of 2,6-dihydroxybenzoic acid, 2,6-diacetoxybenzoic acid, 2,6-dimethylthiobenzoic acid, 2,4,6-trinitrobenzoic acid, 2,6-diacetamidobenzoic acid, 2,6-dibromobenzoic acid, 2,6-dimethylbenzoic acid, 2,6-diethylbenzoic acid, 2,6-diisopropylbenzoic acid, 2,6-diallyloxybenzoic acid, 3-bromo-2,6-dimethoxybenzoic acid, 4-chloro-2,6-dimethoxybenzoic acid, 2-chloro-6-nitrobenzoic acid, 2-hydroxy-6-methoxybenzoic acid, respectively, to produce the acids 6-(2,6-dihydroxybenzamido)penicillanic acid,
6-(2,6-dihydroxybenzamido)penicillanic acid,
6-(2,6-dimethylthiobenzamido)penicillanic acid,
6-(2,4,6-trinitrobenzamido)penicillanic acid,
6-(2,6-diacetamidobenzamido)penicillanic acid,
6-(2,6-dibromobenzamido)penicillanic acid,
6-(2,6-dimethylbenzamido)penicillanic acid,
6-(2,6-diethylbenzamido)penicillanic acid,
6-(2,6-diisopropylbenzamido)penicillanic acid,
6-(2,6-diallyloxybenzamido)penicillanic acid,
6-(3-bromo-2,6-dimethoxybenzamido)penicillanic acid,
6-(4-chloro-2,6-dimethoxybenzamido)penicillanic acid,
6-(2-chloro-6-nitrobenzamido)penicillanic acid and
6-(2-hydroxy-6-methoxybenzamido)penicillanic acid, respectively, which are isolated as their water-soluble potassium salts and are found to contain the $\beta$-lactam ring structure as shown by infrared analysis and to inhibit *Staph. aureus* Smith at concentrations below 0.001 percent by weight.

While in the foregoing specification various embodiments of this invention have been set forth and specific details thereof elaborated for the purpose of illustration, it will be apparent to those skilled in the art that this invention is susceptible to other embodiments and that many of these details may be varied widely without departing from the basic concept and spirit of the invention.

We claim:
1. 6-(2,6-dimethoxybenzamido)penicillanic acid.
2. A compound selected from the group consisting of an acid having the formula:

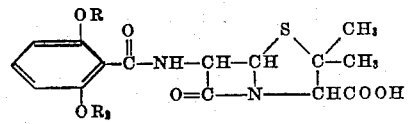

wherein $R_1$ and $R_2$ each represents a member selected from the group consisting of methyl and ethyl; and its sodium, potassium, calcium, aluminum and ammonium salts and its nontoxic substituted ammonium salts with an amine selected from the group consisting of tri(lower) alkylamines, procaine, dibenzylamine, N-benzylbeta-phenethylamine, 1-ephenamine, N,N'-dibenzylethylenediamine, dehydroabietylamine, N-(lower)alkylpiperidines and N,N'-bisdehydroabietylethylenediamine.
3. 6-(2,6-diethoxybenzamido)penicillanic acid.
4. 6-(2-ethoxy-6-methoxybenzamido)penicillanic acid.
5. Sodium 6-(2,6-dimethoxybenzamido)penicillanate.
6. Potassium 6-(2,6-dimethoxybenzamido)penicillanate.
7. Dibenzylamine 6-(2,6-dimethoxybenzamido)penicillanate.
8. N,N'-dibenzylethylenediamine 6-(2,6-dimethoxybenzamido)penicillanate.
9. N,N'-dehydroabietylethylenediamine 6-2,6-dimethoxybenzamido)penicillanate.

References Cited in the file of this patent
UNITED STATES PATENTS

| | | |
|---|---|---|
| 2,479,295 | Behrens et al. | Aug. 16, 1949 |
| 2,479,296 | Behrens et al. | Aug. 16, 1949 |
| 2,479,297 | Behrens et al. | Aug. 16, 1949 |
| 2,941,995 | Doyle et al. | June 21, 1960 |

FOREIGN PATENTS

| | | |
|---|---|---|
| 569,728 | Belgium | Nov. 15, 1958 |

OTHER REFERENCES

The Chemistry of Penicillin, page 674, Princeton University Press (1949).